US006606347B1

United States Patent
Ishii (10) Patent No.: US 6,606,347 B1
(45) Date of Patent: Aug. 12, 2003

(54) MULTISTAGE INTERFERENCE CANCELLER USING PRIMARY AND SECONDARY PATH TIMINGS

(75) Inventor: Tatsuya Ishii, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/556,406

(22) Filed: Apr. 24, 2000

(30) Foreign Application Priority Data

Apr. 27, 1999 (JP) .......................................... 11-120520

(51) Int. Cl.$^7$ .............................. H04B 1/707; H04B 1/10
(52) U.S. Cl. ....................... 375/144; 375/148; 375/346; 370/335; 370/342; 455/296
(58) Field of Search ................................ 375/346, 144, 375/148, 349; 370/342, 335; 455/296, 295

(56) References Cited

U.S. PATENT DOCUMENTS

| | | | | |
|---|---|---|---|---|
| 6,081,516 A | * | 6/2000 | Yashida et al. | 370/342 |
| 6,157,685 A | * | 12/2000 | Tanaka et al. | 375/346 |
| 6,222,498 B1 | * | 4/2001 | Ishii et al. | 370/342 |
| 6,282,233 B1 | * | 8/2001 | Yashida | 375/148 |
| 6,404,759 B1 | * | 6/2002 | Shoji | 370/342 |

FOREIGN PATENT DOCUMENTS

| | | |
|---|---|---|
| JP | 9-270736 | 10/1997 |
| JP | 9-270766 | 10/1997 |
| JP | 9-331274 | 12/1997 |
| JP | 10-51353 | 2/1998 |
| JP | 10-190494 | 7/1998 |

* cited by examiner

*Primary Examiner*—Temesghen Ghebretinsae
(74) *Attorney, Agent, or Firm*—Sughrue Mion, PLLC (57) ABSTRACT

Each of path search unit $4_1 \ldots 4_N$ performs a path-searching on a received signal $r_{in}$ to output a primary path timing signal 8 indicating primary path timings. Each of IEUs $1_1 \ldots 1_N$ in a first stage performs a despreading or the like on the basis of the primary path timing signal 8 to generate a symbol replica signal $5_1$ and a chip replica signal 6. Subtractor $3_1$ subtracts the sum of chip replica signals 6 from the received signal $r_{in}$ to generate a residual signal 7. Each of path search units $4_1 \ldots 4_N$ performs a path-searching on the residual signal 7, and outputs a secondary path signal 9 indicating secondary path timings. A primary path timing of which SIR is low and which has a temporary secondary path timing which is near to the primary path timing is not selected as a secondary path timing but the corresponding temporary secondary path is selected as the secondary path timing. A primary path timing of which SIR is not low or which does not have a temporary secondary path timing which is near to the primary path timing is selected as a secondary path timing. Each of IEUs $1_1 \ldots 1_N$ in the second and the following stages performs a despreading or the like on the basis of the secondary path timing signal 9.

12 Claims, 7 Drawing Sheets

MULTISTAGE INTERFERENCE CANCELLER USING PRIMARY AND SECONDARY PATH TIMINGS

BACKGROUND OF THE INVENTION

1. Field of the Invention

The present invention relates to a CDMA (Code Division Multiple Access) communication system and in particular, to a multistage interference canceller which extracts a signal component for each user by eliminating signal components for other users from a received signal containing spread modulated signals for a plurality of users.

2. Description of the Prior Art

In recent years, a CDMA communication system has been attracted attentions among communication systems which are used for mobile communication systems. In the CDMA communication system, a transmission side transmits a spectrum spread signal which is obtained by spectrum-spreading a user signal with a spread code whose chip rate is tens to hundreds times as fast as the bit rate of the user signal, and a reception side obtains the original user signal by spectrum-despreading the spectrum spread signal with the same spread code as the transmission side. Here, a user signal to be transmitted as information is referred to as a symbol, and a unit constituting a spread code is referred to as a chip.

Although a single user receiver which demodulates a signal for a single user is generally used as a receiver in a reception side, a multiple user receiver which simultaneously demodulates signals for a plurality of users is also used as a receiver in a reception side. For the purpose of improving a communication quality when simultaneously demodulating signals for a plurality of users in a multiple user receiver, a multistage interference canceller is proposed.

A multistage interference canceller is such an apparatus that decreases interference from the signals of the other users by performing plural times such an operation in which symbol replica signals which are the same as the signal components of the other users are generated, and the symbol replica signals are subtracted from a received signal to be demodulated before demodulating the received signal containing signals for a plurality of users with a spread signal for a specified user. There are two types of multistage interference canceller, i.e., a serial type and a parallel type.

Next, the structure of a conventional parallel type multistage interference canceller will be explained with reference to FIG. 4.

This conventional parallel type multistage interference canceller has a structure of M stages by N users. As shown in FIG. 4, this conventional parallel type interference canceller comprises IEUs (Interference Estimation Units) $1_1$ ... $1_N$ as many as M×N (M stages×N users), delay circuits (D) $2_1$ ... $2_{M-1}$ as many as M−1, subtractors $3_1$ ... $3_{M-1}$ as many as M−1, and path search units $24_1$ ... $24_N$ as many as N.

Each of delay circuits (D) $2_1$ ... $2_{M-1}$ inputs received signal $r_{in}$ or residual signal 7 to delay it by a prescribed period. The period by which each of delay circuits (D) $2_1$ ... $2_{M-1}$ delays received signal rin or residual signal 7 is the same as the period required to generate symbol replica signals $5_1$ ... $5_{M-1}$ and chip replica signals 6 in IEU $1_1$ ... IEU $1_N$.

Each of subtractors $3_1$ ... $3_{M-1}$ subtracts a sum of chip replicas 6 in each stage from received signal $r_{in}$ or residual signal 7 which is outputted from each of delay circuits $2_1$ ... $2_{M-1}$ in order to output residual signal 7 thus subtracted to the next stage.

Figure 5:
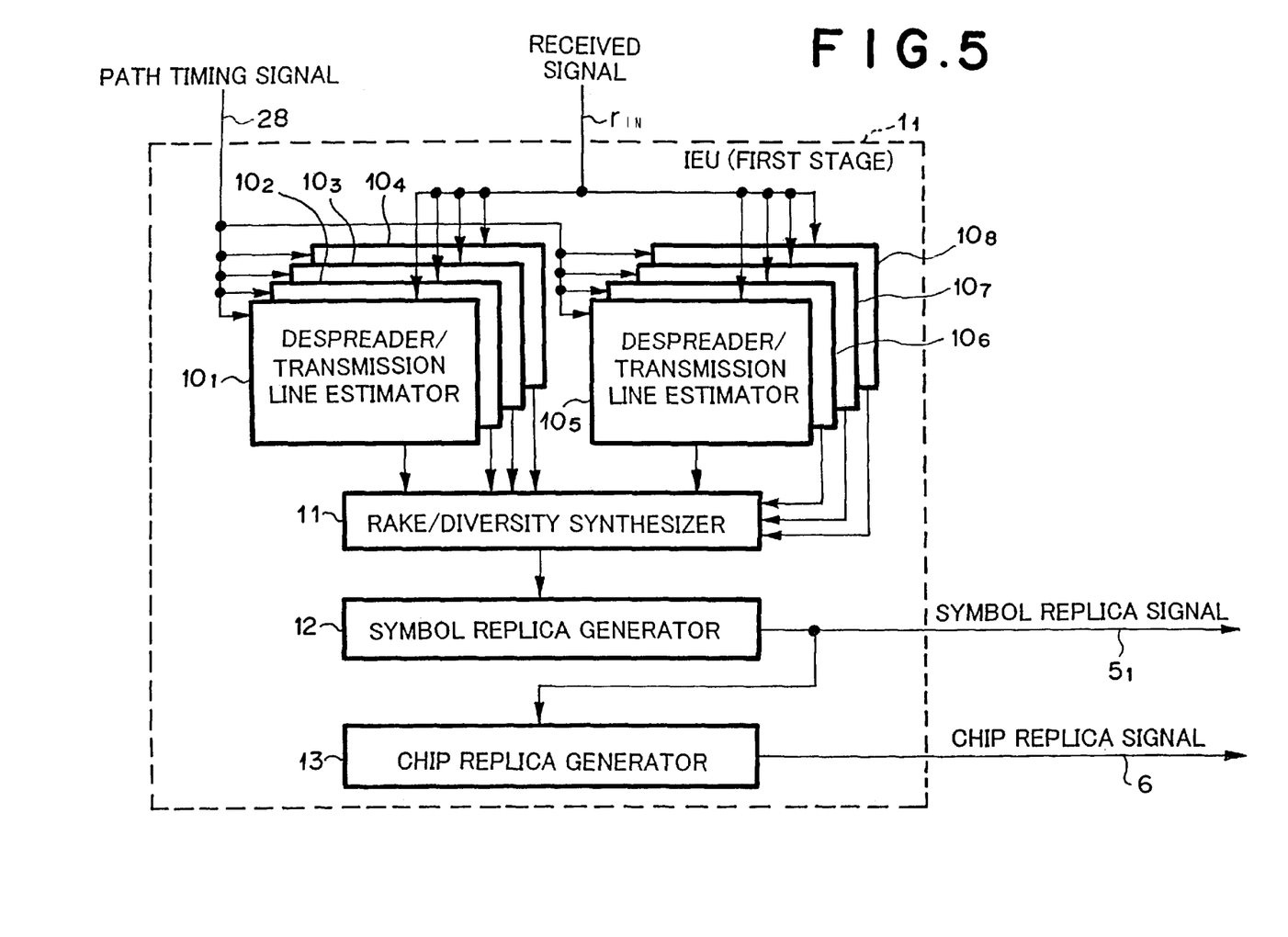
FIG. 5 is a block diagram showing the structure of an IEU in a first stage as shown in FIGS. 1, 3, and 4.
Figure 6:
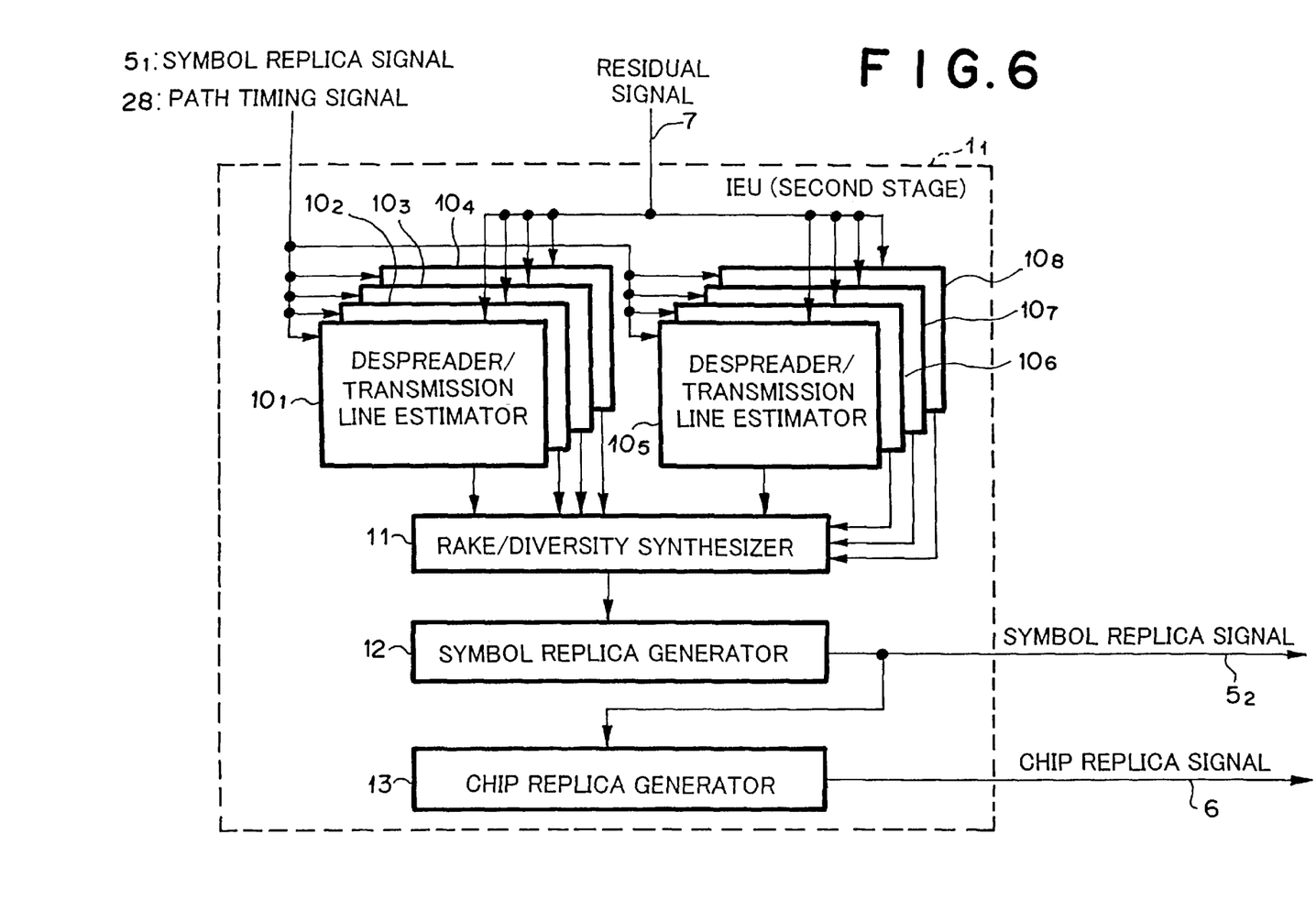
FIG. 6 is a block diagram showing the structure of an IEU in a second stage as shown in FIGS. 1, 3, and 4.

FIG. 5 shows the structure of IEU $1_1$ in the first stage and input signals thereto, and FIG. 6 shows the structure of IEU $1_1$ in the second stage and input signals thereto. IEU $1_1$ ... IEU $1_N$ are different from one another only in that spread codes which are set to them are correspondent to respective users among the first to the N-th users, and their operations are the same. Therefore, the explanation of the structure and operation of IEU $1_1$ will be made below.

IEU $1_1$ comprises despreader/transmission line estimator $10_1$ ... $10_8$, rake/diversity synthesizer 11, symbol replica generator 12, and chip replica generator 13. Here, the explanation will be made assuming that IEU $1_1$ ... IEU $1_N$ are of 2-branch×4-path structure.

IEU $1_1$ in the first stage and IEU $1_1$ in the second stage are different from each other in that signals inputted thereto are different from each other, and their structures are the same. IEU $1_1$ in the M-th stage is the same as IEUs $1_1$ in the other stages in structure except that chip replica generator 13 is deleted from IEU $1_1$ in the M-th stage.

Each of despreader/transmission line estimator $10_1$ ... $10_8$ performs despreading, adds a symbol replica signal $5_1$, and estimates a transmission line every path and every branch on the basis of a path timing indicated by path timing signal 28.

IEU $1_1$ to IEU $1_N$ are correspondent to the signals of the first to the N-th users, respectively. Despreaders/transmission line estimators $10_1$ ... $10_8$ perform despreading with spread codes of respective users.

Rake/diversity synthesizer 11 performs rake synthesis and diversity synthesis on signals from despread/transmission line estimator $10_1$ ... $10_8$ to output synthesized signal as one signal.

Symbol replica generator 12 generates symbol replica signal $5_1$ or $5_2$ on the basis of a signal from rake/diversity synthesizer 11 to output symbol replica signal $5_1$ or $5_2$ to IEU $1_1$ in the next stage.

Chip replica generator 13 generates chip replica signal 6 by re-spreading symbol replica $5_1$ generated in symbol replica generator 12.

In accordance with the structure explained above, IEU $1_1$ in the first stage generates symbol replica signal $5_1$ to be outputted to the second stage and chip replica signal 6 to be outputted to the second stage from received signal $r_{in}$ on the basis of path timing signal 28. IEU $1_1$ in the second stage generates symbol replica signal $5_2$ to be outputted to the third stage and chip replica signal 6 to be outputted to the third stage from residual signal 7 and symbol replica signal $5_1$ from the first stage on the basis of path timing signal 28.

Path search units $24_1$ ... $24_N$ are different from one another only in that spread codes which are set thereto are correspondent to respective users among the first to the N-th users, and their operations are the same. Therefore, path search unit $24_1$ will be explained.

Figure 7:
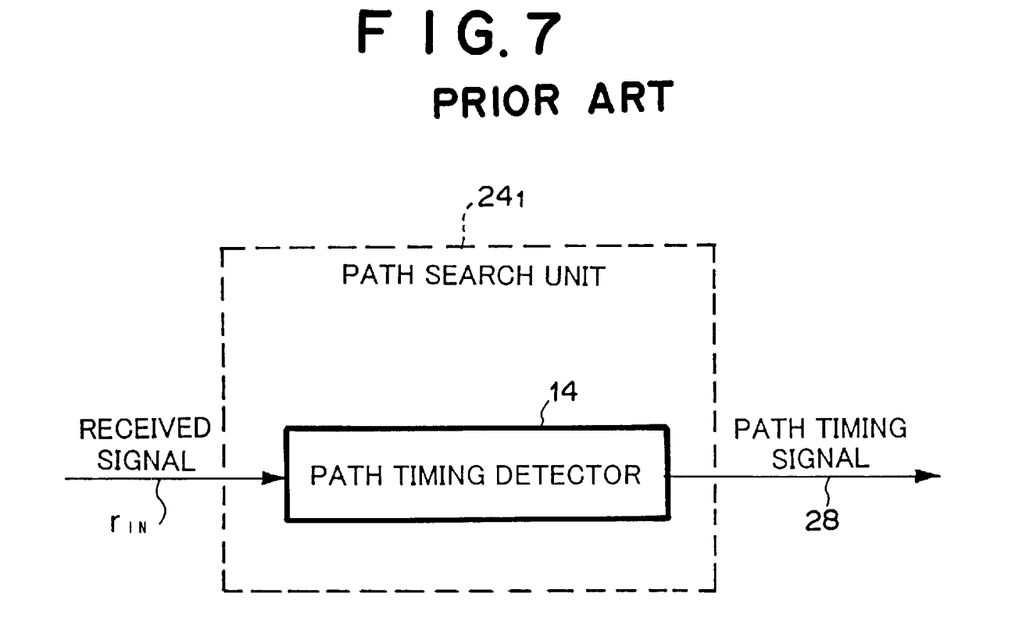
FIG. 7 is a block diagram showing the structure of the path search unit as shown in FIG. 4.

Path search unit $24_1$ comprises path timing detector 14 as shown in FIG. 7. Path timing detector 14 inputs received signal $r_{in}$, performs path searching by using a spread code corresponding to the first user, and outputs the searched path timing as path timing signal 28.

Figure 4:
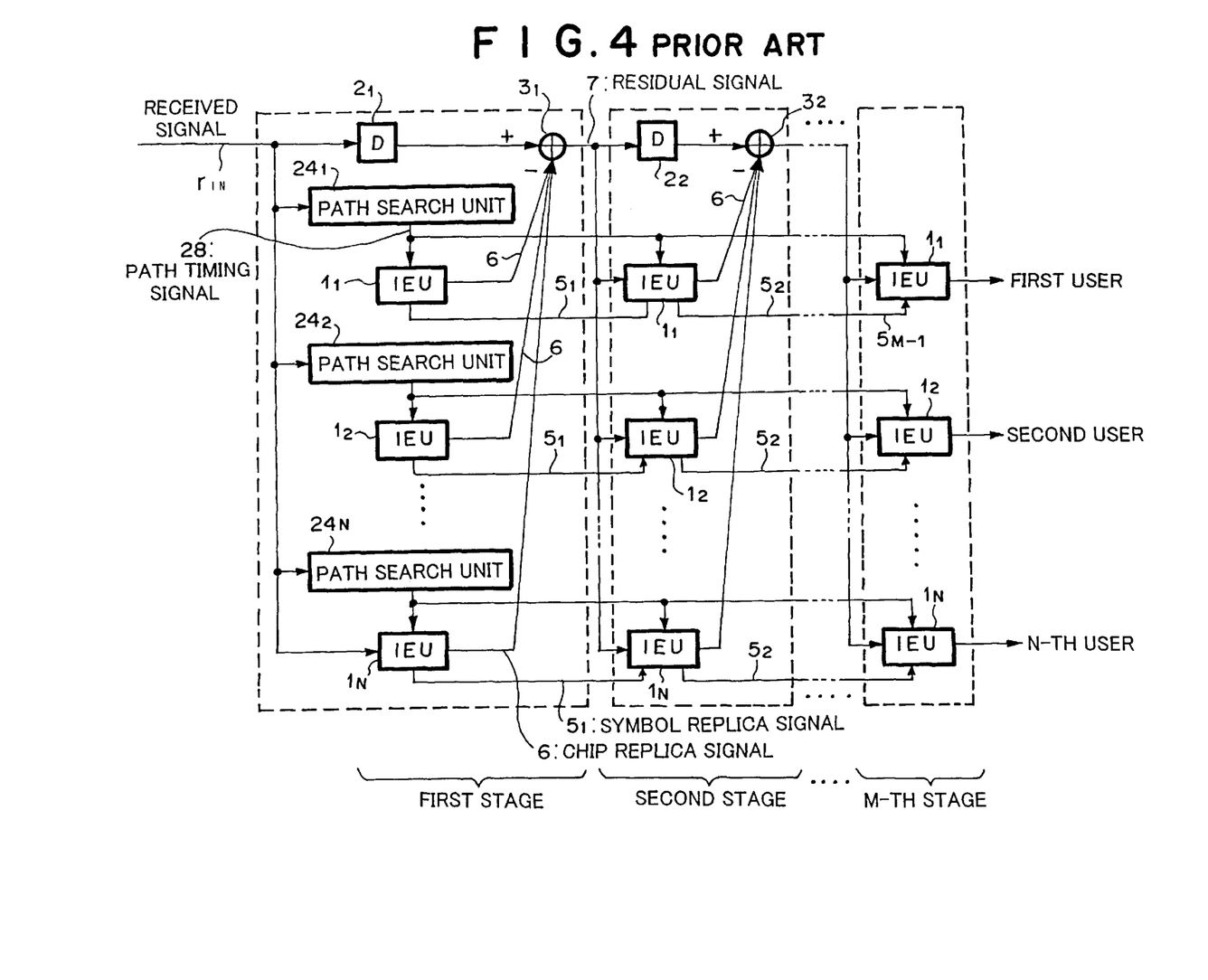
FIG. 4 is a block diagram showing the structure of a multistage interference canceller according to the prior art.

Next, the operation of the conventional multistage interference canceller as shown in FIG. 4 will be explained.

Upon inputting received signal $r_{in}$, path timing detector 14 in path search unit $24_1$ performs path searching by using the spread code corresponding to the first user and outputs the obtained path timing as path timing signal 28. IEU $1_1$ in the first stage despreads received signal $r_{in}$ every path and every branch on the basis of the path timing indicated by path timing signal 28, and also performs transmission line estimation, rake synthesis, and diversity synthesis to generate symbol replica $5_1$, and chip replica 6.

Subtractor 31 subtracts the sum of chip replicas outputted from IEUs $1_1 \ldots 1_N$ from received signal $r_{in}$ from delay circuit 21 to output residual signal 7 to the second stage.

IEU $1_1$ in the second stage despreads residual signal 7 every path and every branch on the basis of the path timing indicated by path timing signal 28, adds symbol replica signal $5_1$ to residual signal 7 which has been despread, and performs transmission line estimation, rake synthesis, and diversity synthesis to generate symbol replica $5_2$, and chip replica 6.

Further, in the third and the following stages, the same operation as the second stage is performed. The M-th stage which is the final stage outputs the first to the N-th user signals from IEUs $1_1 \ldots 1_N$, respectively.

In the conventional multistage interference canceller as explained above, path search units $24_1 \ldots 24_N$ are provided only in the first stage. IEUs $1_1 \ldots 1_N$ perform processes up to the final stage using path timing signal 28 generated by a single path search in path search units $24_1 \ldots 24_N$. However, if a reception power of a certain user signal is weak, the user signal is subject to interferences from the other user signals. Because path search units $24_1 \ldots 24_N$ perform path searching using received signal rin from which interferences from the other user signals are not get rid of, when detecting a path timing of a user signal whose reception power is weak, there is generated such a case that an accurate path timing is not detected and an miss-detection takes place. As a result, the reception performance of the CDMA reception apparatus deteriorates due to the miss-detection of the path timings.

The conventional multistage interference canceller explained above has a disadvantage that it's reception performance deteriorates due to miss-detection of path timings when a reception power of a certain user signal is weak.

SUMMARY OF THE INVENTION

In order to overcome the aforementioned disadvantages, the present invention has been made and accordingly, has an object to provide a multistage interference canceller which is improved in reception performance by detecting accurate path timings even for user signals whose reception powers are weak.

According to a first aspect of the present invention, there is provided a multistage interference canceller for extracting each user signal from a received signal containing spectrum spread signals of a plurality of users by removing signal components of the users other than each user, said canceller comprising: a first stage comprising: a plurality of first interference estimation units provided for respective users, each of said first interference estimation units generating a first symbol replica signal and a first chip replica signal from said received signal on the basis of primary path timings, said first symbol replica signal being the same as a signal component of each user, and said first chip replica signal being a respread signal from said first symbol replica signal; a first delay circuit for outputting said received signal after delaying said received signal by a first prescribed period; and a first subtractor for subtracting a sum of a plurality of said first chip replica signals which are outputted from a plurality of said first interference estimation units from said received signal which is outputted from said first delay circuit to output the residual as a first residual signal; a plurality of path search units provided for respective users, each of said path search units comprising: means for setting path timings which are obtained by performing path search on said received signal using a spread signal as said primary path timings; means for setting path timings which are obtained by performing path search on said first residual signal supplied from said first stage as temporal secondary path timings of paths having said primary path timings; and means for setting said temporal secondary path timing as a secondary path timing for each path of which signal-to-interference ratio measured is lower than a first prescribed threshold and of which a time difference between said primary path timing thereof and said temporal secondary path timing thereof is shorter than a second prescribed threshold, and for setting said first path timing as a secondary path timing for each path of which signal-to-interference ratio measured is not lower than said first prescribed threshold or of which a time difference between said primary path timing thereof and said temporal secondary path timing thereof is not shorter than said second prescribed threshold; a second stage comprising: a plurality of second interference estimation units provided for respective users, each of said second interference estimation units generating a second symbol replica signal and a second chip replica signal from said first residual signal supplied from said first stage and said first symbol replica signal on the basis of secondary path timings, said second symbol replica signal being the same as a signal component of each user, and said second chip replica signal being a respread signal from said second symbol replica signal; a second delay circuit for outputting said first residual signal after delaying said first residual signal by a second prescribed period; and a second subtractor for subtracting a sum of a plurality of said second chip replica signals which are outputted from a plurality of second interference estimation units from said first residual signal which is outputted from said second delay circuit to output the residual as a second residual signal to be supplied to a third stage; and a third stage comprising: a plurality of third interference estimation units provided for respective users, each of said third interference estimation unit generating said user signal from said second residual signal supplied from said second stage and said second symbol replica signal supplied from said second stage.

According to a second aspect of the present invention, there is provided a multistage interference canceller for extracting each user signal from a received signal containing spectrum spread signals of a plurality of users by removing signal components of the users other than each user, said canceller comprising: a first stage comprising: a plurality of first interference estimation units provided for respective users, each of said first interference estimation units generating a first symbol replica signal and a first chip replica signal from said received signal or a first subtracted signal on the basis of primary path timings, said first symbol replica signal being the same as a signal component of each user, and said first chip replica signal being a respread signal from said first symbol replica signal; a plurality of first delay circuits connected one another in series, each of said first delay circuit outputting said received signal or a signal inputted thereto after delaying said received signal or the signal inputted thereto by a first prescribed period; and a plurality of first subtractors, each of said first subtractors being provided after each of said first delay curcuits and subtracting said first chip replica signal which is outputted from each of said first interference estimation units from a signal outputted from a preceding first delay circuit to output the residual as said first subtracted signal to a succeeding first delay circuit and a corresponding first interference estimation unit; a plurality of path search units provided for respective users, each of said path search units comprising: means for setting path timings which are obtained by performing path search on said received signal using a spread signal or said first subtracted signal as said primary path timings; means for setting path timings which are obtained by performing path search on a residual signal which is an output from the last of said first subtractors or a second subtracted signal as temporal secondary path timings of paths having said primary path timings; and means for setting said temporal secondary path timing as a secondary path timing for each path of which signal-to-interference ratio measured is lower than a first prescribed threshold and of which a time difference between said primary path timing thereof and said temporal secondary path timing thereof is shorter than a second prescribed threshold, and for setting said first path timing as a secondary path timing for each path of which signal-to-interference ratio measured is not lower than said first prescribed threshold or of which a time difference between said primary path timing thereof and said temporal secondary path timing thereof is not shorter than said second prescribed threshold; a second stage comprising: a plurality of second interference estimation units provided for respective users, each of said second interference estimation units generating a second symbol replica signal and a second chip replica signal from said first residual signal or said second subtracted signal and said first symbol replica signal on the basis of secondary path timings, said second symbol replica signal being the same as a signal component of each user, and said second chip replica signal being a respread signal from said second symbol replica signal; a plurality of second delay circuits connected one another in series, each of said second delay circuits outputting said first residual signal or a signal inputted thereto after delaying said first residual signal or the signal inputted thereto by a second prescribed period; and a plurality of second subtractors, each of said second subtractors being provided after each of said second delay circuits and subtracting said second chip replica signal which is outputted from each of said second estimation units from a signal outputted from a preceding second delay circuit to output the residual as said second subtracted signal to a succeeding second delay circuit, a corresponding second interference estimation unit, and a corresponding means for setting path timings; and a third stage comprising: a plurality of third interference estimation units provided for respective users, each of said third interference estimation units generating said user signal and a third chip replica signal from a second residual signal which is an output from the last of said second subtractors or a third subtracted signal and said second symbol replica signal on the basis of secondary path timings, and said third chip replica signal being a respread signal from said user signal; a plurality of third delay circuits connected one another in series, each of said third delay circuits outputting said second residual signal or a signal inputted thereto after delaying said second residual signal or the signal inputted thereto by a third prescribed period; and a plurality of third subtractors, each of said third subtractors being provided after each of said third delay circuits and subtracting said third chip replica signal which is outputted from each of said third estimation units from a signal outputted from a preceding third delay circuit to output the residual as said third subtracted signal to a succeeding third delay circuit and a corresponding third interference estimation unit.

These and other objects, features and advantages of the present invention will become more apparent in the light of the following detailed description of the best mode embodiments thereof, as illustrated in the accompanying drawings.

DETAILED DESCRIPTION OF THE PREFERRED EMBODIMENT

Preferred modes of embodiment according to the present invention will be described with reference to the accompanying drawings.

Figure 1:
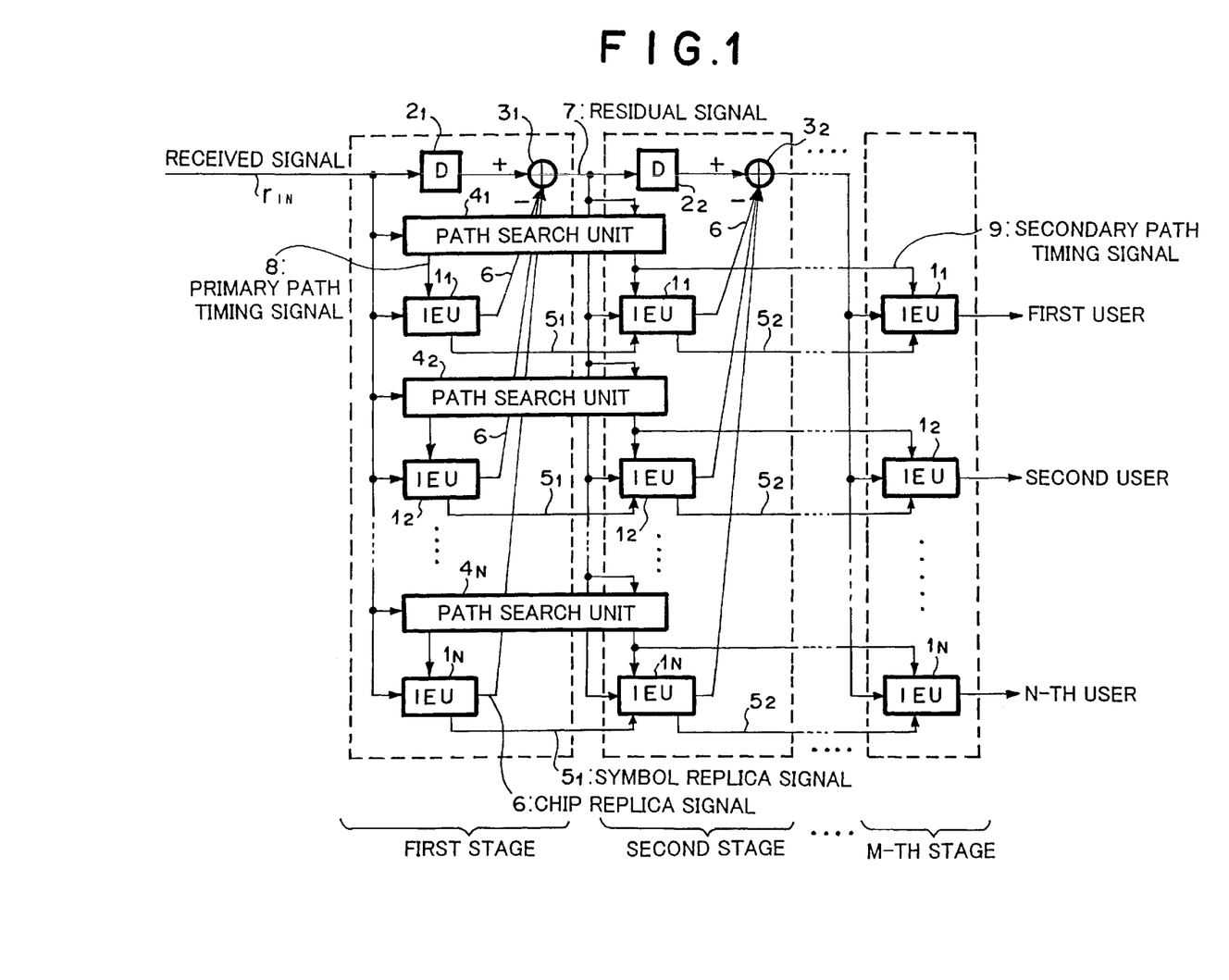
FIG. 1 is a block diagram showing the structure of a multistage interference canceller according to a first embodiment of the present invention.

FIG. 1 is a block diagram showing the structure of a multistage interference canceller according to the first embodiment of the present invention. Members attached with the same references with FIGS. 4–7 are the same members as the conventional multistage interference canceller. The multistage interference canceller according to this embodiment is a parallel type multistage interference canceller to which the present invention is applied.

The multistage interference canceller according to the present invention is the same as the conventional multistage interference canceller as shown in FIG. 4 except for comprising path search units $4_1 \ldots 4_N$ in place of path search units $24_1 \ldots 24_N$.

Each of path search units $4_1 \ldots 4_N$ outputs primary path timing signal 8 and secondary path timing signal 9. Each of IEUs $1_1 \ldots 1_N$ in the first stage inputs primary path timing signal 8, and each of IEUs $1_1 \ldots 1_N$ in the second to M-th stages inputs secondary path timing signal 9.

Figure 2:
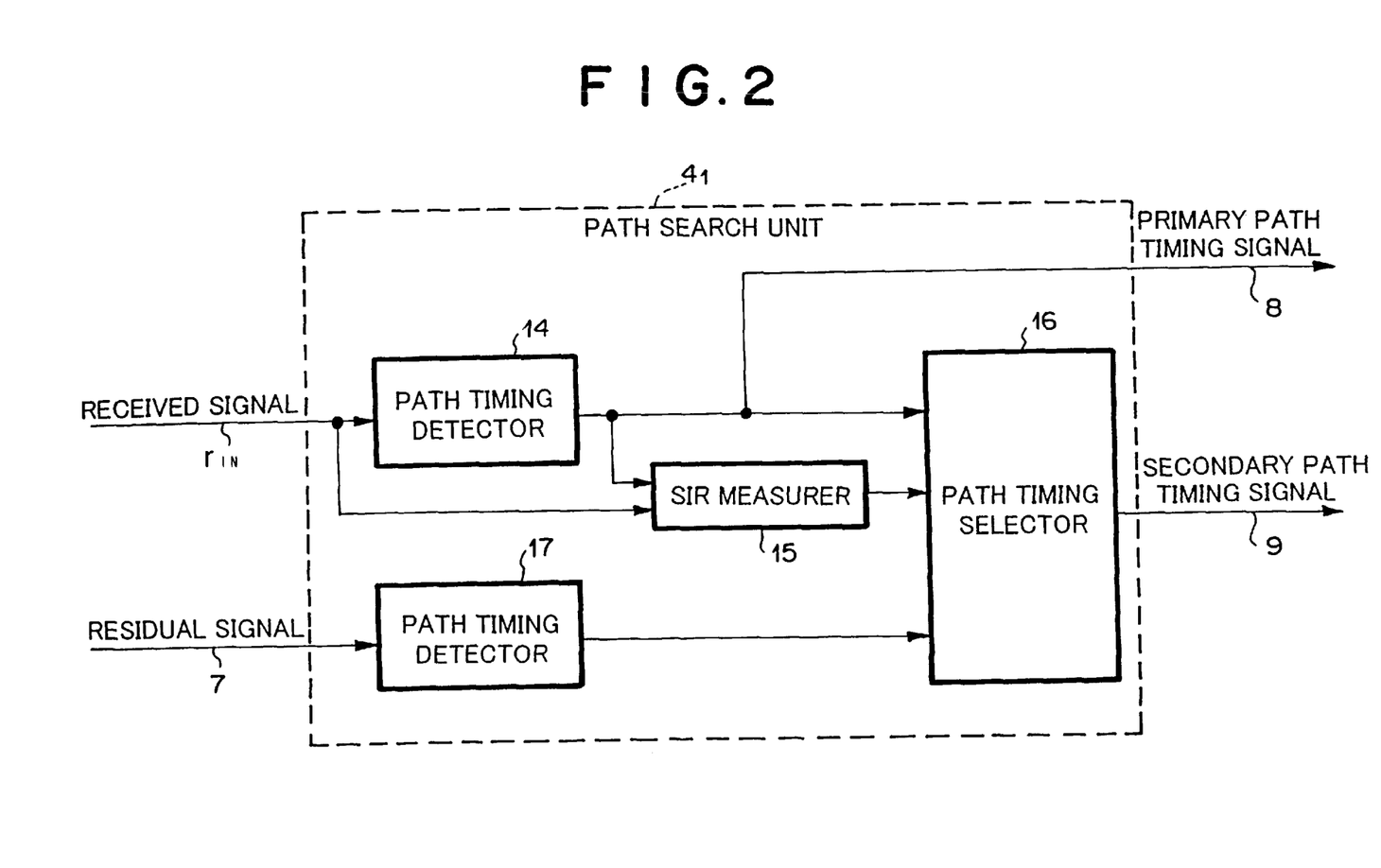
FIG. 2 is a block diagram showing the path search unit as shown in FIG.

FIG. 2 shows the structure of path search unit $4_1$ which is a feature of this embodiment. Path search units $4_2 \ldots 4_N$ are similar to path search unit $4_1$ except that spread codes which are set thereto are correspondent to respective users. Therefore, explanation of the structure and operation of path search units $4_2 \ldots 4_N$ is omitted.

Path search unit $4_1$ comprises path timing detectors 14, 17, SIR (Signal to Interference Ratio) measurer 15, and path timing selector 16.

Path timing detector 14 inputs received signal $r_{in}$, performs a path searching using the spread code correspondent to the first user, and outputs the obtained path timings as primary path timing signal 8.

Path timing detector 17 inputs residual signal 7, performs a path searching using the spread signal correspondent to the first user, and outputs the obtained path timings as a temporal secondary path timing signal to path timing selector 16. The reason why path timing detector 17 uses residual signal 7 when performing path search will be explained as follows:

If interferences from the other user signals are not strong, accurate path timings can be obtained by a detection of path timings using reception signal $r_{in}$ performed by path timing detector 14. However, if interferences from the other user signals are strong, a case path timings obtained by a path searching using residual signal 7 is more accurate than path timings obtained by a path searching using received signal $r_{in}$ arises. There are two reasons why such case arises. The first reason is that residual signal 7 is decreased in interference to a user signal whose reception power is weak from the other user signals because the other user signals are subtracted from received signal $r_{in}$ to obtain residual signal 7. The second reason is that user signals which are generated by IEUs $1_1 \ldots 1_N$ in the first stage and whose reception electric fields are weak become inaccurate because accurate path timings are not obtained in the first stage, and such user signals are scarcely subtracted from received signal $r_{in}$ and remain as signal components of residual signal 7.

SIR measurer 15 measures SIR of reception signal $r_{in}$ every path. An example of how to measure SIR is as follows: Performed are to obtain a first integral in a prescribed period (a pilot symbol period or the like) of the total power of the received signal to set the first integral as (S+I). Next, it is performed to obtain a second integral in the same prescribed period of a power after despreading in each path to set the second integral as S, to calculate I using equation I=(S+I)−S, and to calculate SIR by obtaining the ratio of S to I.

Path timing selector 16 selects the paths whose SIR measured by SIR measurer 15 are lower than SIR threshold α from a plurality of primary path timings obtained by path timing detector 14, searches for each path for which a time difference between a primary path timing and a temporal secondary path timing obtained in timing detector 17 is shorter than a correction time difference threshold β, and if such path(s) are searched for, outputs the temporal secondary path timing(s) of such path(s) as secondary path timing signal 9. As to a path whose SIR is higher than SIR threshold α, a primary path timing obtained in path timing detector 14 is outputted as secondary path timing signal 9 without change. In addition, even when path(s) whose SIR are lower than SIR threshold α exist, if there is not a path for which the time difference between the primary path timing and the secondary path timing obtained in path timing detector 17 is shorter than correction time difference threshold β among such path(s), the primary path timings obtained in path timing detector 14 are outputted as secondary path timing signal 9 without change.

Next, the operation of the multistage interference canceller according to this embodiment will be explained.

Received signal $r_{in}$ is inputted to IEUs $1_1 \ldots 1_N$, path search unit $4_1 \ldots 4_N$, and delay circuit 21 in the first stage. Path search unit $4_1 \ldots 4_N$ perform path search for received signal $r_{in}$ using a spread signal of respective users and output primary path search timing signal 8 to IEUs $1_1 \ldots 1_N$, respectively. In addition, path search unit $4_1 \ldots 4_N$ measure SIR of respective paths by means of SIR measurer 15.

IEUs $1_1 \ldots 1_N$ in the first stage output symbol replica signal $5_1 \ldots 5_N$, respectively, and chip replica signals 6 generated from received signal $r_{in}$ on the basis of respective primary path timings indicated by respective primary path timing signals 8.

Subtractor 31 subtracts the sum of chip replica signals 6 outputted from IEUs $1_1 \ldots 1_N$ from received signal $r_{in}$ which is delayed in delay circuit 21 by a process time of IEUs $1_1 \ldots 1_N$ to output the residual as residual signal 7 to the second stage.

In the second stage, path search units $4_1 \ldots 4_N$ input residual signal 7 and perform path searchings for respective users using residual signal 7. Next, path timing selector 16 searches for paths whose SIRs measured in SIR measurer 15 are lower than SIR threshold α from path timings obtained in path timing detector 14. In addition, among thus searched paths, paths for each of which a time difference between the primary path timing and the temporal secondary path timing is shorter than threshold β are searched for, and if such paths are searched for, path timings obtained by path timing detector 17 are set as secondary path timings of such paths. As to the other paths (paths whose SIRs are higher than SIR threshold α), the primary path timings are used as the secondary path timings without change. Now, there is presented an example in which the following paths are searched for when SIR threshold α=3[dB], correction time difference threshold β=2[chip time]. Here, path timings are counted by the number of chips from the beginning of a slot.

Primary path timings and SIRs in received signal $r_{in}$ for each path

|  | path timing | SIR |
|---|---|---|
| first path: | 10 chips | 10 dB |
| second path: | 25 chips | 5 dB |
| third path: | 35 chips | 2.5 dB |

Path timings calculated from residual signal 7 inputted to the second stage

|  | path timing |
|---|---|
| first path: | 25 chips |
| second path: | 36 chips |

In this example, because among primary path timings, the SIR of the third path is lower than SIR threshold α, a substitutional path candidate for the third path is searched for from path timings calculated from residual signal 7 inputted to the second stage. Because a time difference (36−35=1 chip time) between the third path among the primary paths and the second path among temporal secondary paths is shorter than correction time difference threshold β (2 chip time), the second path among temporal secondary paths is selected as the third path among secondary paths. As a result, the secondary path timings are determined as follows:

Secondary path timings

|  | path timing |
|---|---|
| first path: | 10 chips |
| second path: | 25 chips |
| third path: | 36 chips |

IEUs $1_1 \ldots 1_N$ in the second stage input secondary path timing signal 9 indicative of secondary path timings obtained as explained above, residual signal 7, and symbol replica signals $5_1 \ldots 5_N$, respectively, from the first stage to perform the similar operation as the first stage.

In this embodiment, the primary path timings are obtained by a path searching using received signal $r_{in}$, and each of IEUs $1_1 \ldots 1_N$ in the first stage performs despreading using the primary path timings. Each of path search units $4_1 \ldots 4_N$ again perfoms a path searching using residual signal 7 inputted to the second stage. In case SIR of a path corresponding to a certain primary path timing is lower than SIR threshold α and simultaneously there exists a temporal secondary path timing which falls within a range of correction time difference threshold β from the primary path timing, the temporal secondary path timing instead of the first path timing is used as the secondary path timing.

In addition, in this embodiment, the reason why SIR threshold α and correction time difference threshold β are set is to prevent a case in which an accurate path is miss-corrected and whereby the accuracy of path timings deteriorates on the contrary. That is, if the SIR of a path for which a primary path timing has been obtained is high, it is avoided that the primary path timing is changed. It is avoided that a secondary path timing becomes largely different from a primary path timing.

[Embodiment 2]

Figure 3:
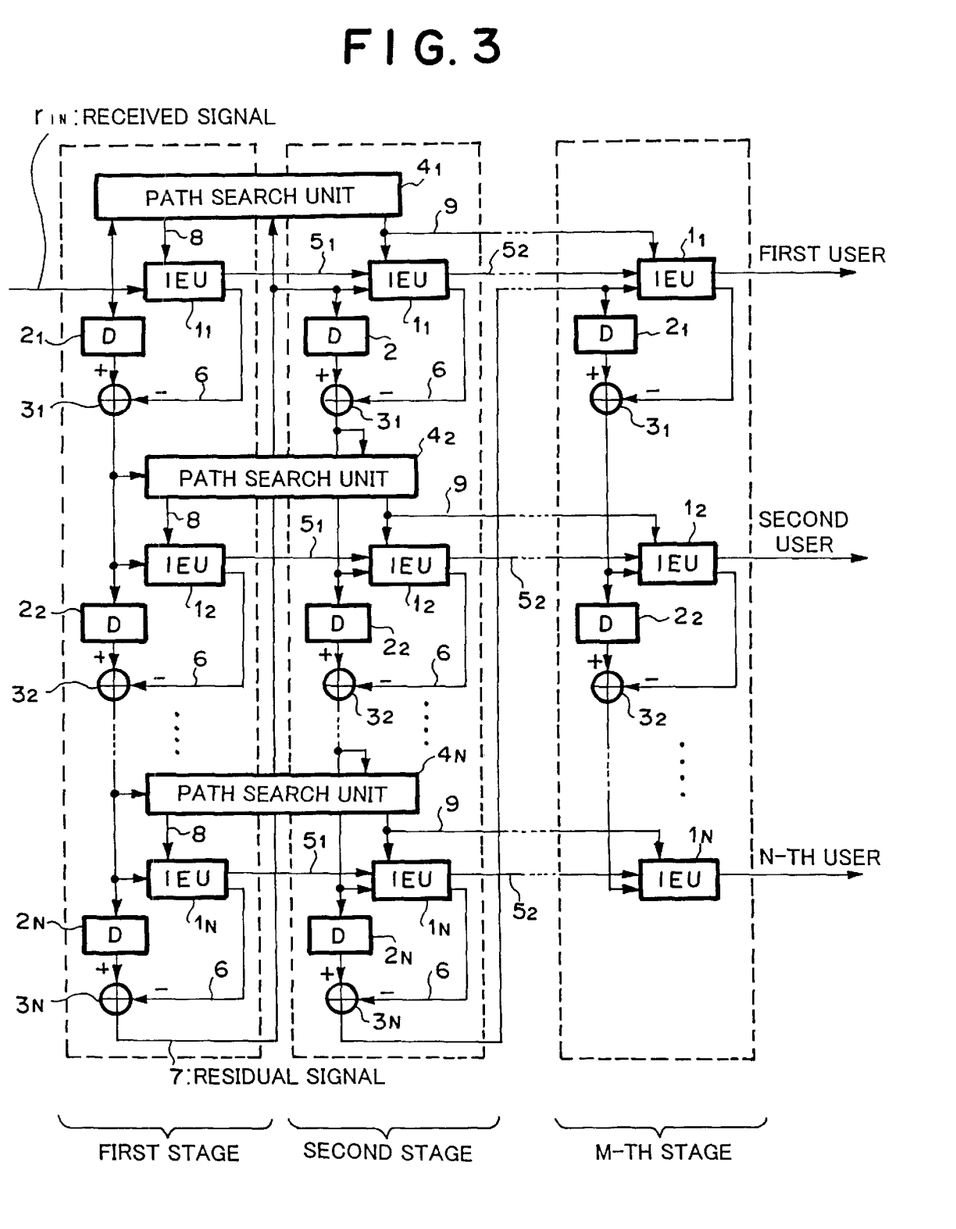
FIG. 3 is a block diagram showing the structure of a multistage interference canceller according to a second embodiment of the present invention.

The structure of a serial type multistage interference canceller according to the second embodiment of the present invention is shown in FIG. 3.

The serial type multistage interference canceller of this embodiment comprises IEUs (Interference Estimation Unit) $1_1 \ldots 1_N$ as many as M×N (M stages×N users), delay circuits (D) $2_1 \ldots 2_N$ as many as M×N−1, subtractors $3_1 \ldots 3_N$ as many as M×N−1, and path search units $4_1 \ldots 4_N$ as many as N.

The operation of the serial type multistage interference canceller will be explained as follows:

In the first stage, subtractors $3_1 \ldots 3_N$ sequentially subtract chip replica signals 6 generated in IEU $1_1 \ldots 1_N$ from received signal $r_{in}$, and subtractor $3_N$ outputs residual signal 7. Path search units $4_1 \ldots 4_N$ again perform path search using residual signal 7 to generate secondary path timing signals 9. Therefore, the serial type multistage interference canceller to which the present invention is applied takes the similar effect as the parallel type multi stage interference canceller to which the present invention is applied.

As explained above, the present invention takes the effect that an accurate path timings can be detected and reception performance can be improved even for a user signal whose reception power is weak because, path timings once detected are corrected using a residual signal inputted to the second stage.

Although the present invention has been shown and explained with respect to the best mode embodiments thereof, it should be understood by those skilled in the art that the foregoing and various other changes, omissions, and additions in the form and detail thereof may be made therein without departing from the spirit and scope of the present invention.

What is claimed is:

1. A multistage interference canceller for extracting each user signal from a received signal containing spectrum spread signals of a plurality of users by removing signal components of the users other than said each user, which comprises:

a first stage comprising:
   a plurality of first interference estimation units provided for respective users, each of said first interference estimation units generating a first symbol replica signal and a first chip replica signal from said received signal on the basis of primary path timings, said first symbol replica signal being the same as a signal component of said each user, and said first chip replica signal being a respread signal from said first symbol replica signal;
   a first delay circuit for outputting said received signal after delaying said received signal by a first prescribed period; and
   a first subtractor for subtracting a sum of a plurality of said first chip replica signals which are outputted from a plurality of said first interference estimation units from said received signal which is outputted from said first delay circuit to output the residual as a first residual signal;
a plurality of path search units provided for respective users, each of said path search units comprising:
   means for setting path timings which are obtained by performing path search on said received signal using a spread signal as said primary path timings;
   means for setting path timings which are obtained by performing path search on said first residual signal supplied from said first stage as temporal secondary path timings of paths having said primary path timings; and
   means for setting said temporal secondary path timing as a secondary path timing for each path of which signal-to-interference ratio measured is lower than a first prescribed threshold and of which a time difference between said primary path timing thereof and said temporal secondary path timing thereof is shorter than a second prescribed threshold, and for setting said first path timing as a secondary path timing for each path of which signal-to-interference ratio measured is not lower than said first prescribed threshold or of which a time difference between said primary path timing thereof and said temporal secondary path timing thereof is not shorter than said second prescribed threshold;
a second stage comprising:
   a plurality of second interference estimation units provided for respective users, each of said second interference estimation units generating a second symbol replica signal and a second chip replica signal from said first residual signal supplied from said first stage and said first symbol replica signal on the basis of secondary path timings, said second symbol replica signal being the same as a signal component of said each user, and said second chip replica signal being a respread signal from said second symbol replica signal;
   a second delay circuit for outputting said first residual signal after delaying said first residual signal by a second prescribed period; and
   a second subtractor for subtracting a sum of a plurality of said second chip replica signals which are outputted from a plurality of second interference estimation units from said first residual signal which is outputted from said second delay circuit to output the residual as a second residual signal to be supplied to a third stage; and
a third stage comprising:
   a plurality of third interference estimation units provided for respective users, each of said third interference estimation unit generating said user signal from said second residual signal supplied from said second stage and said second symbol replica signal supplied from said second stage.

2. The multistage interference canceller according to claim 1, wherein more than one second stage is provided between said first stage and said third stage.

3. The multistage interference canceller according to claim 1, wherein said second stage is deleted and wherein said first stage is connected to said third stage.

4. The multistage interference canceller according to claim 1, wherein said first interference estimation unit comprises:
- a plurality of despreaders/transmission line estimators, each of said despreaders/transmission line estimators performing, for each path and for each branch, a despreading and an estimation of a transmission line from said received signal on the basis of said primary path timings;
- a rake/diversity synthesizer which performs a rake synthesis and a diversity synthesis on signals from a plurality of said despreaders/transmission line estimators to output a synthesized signal;
- a symbol replica generator which generates said first symbol replica signal on the basis of said synthesized signal supplied from said rake/diversity synthesizer to output said first symbol replica signal to said second interference estimation unit; and
- a chip replica generator which generates said first chip replica signal by respreading said first symbol replica signal generated in said symbol replica generator to output said first chip replica signal.

5. The multistage interference canceller according to claim 1, wherein said second interference estimation unit comprises:
- a plurality of despreaders/transmission line estimators, each of said despreaders/transmission line estimators performing, for each path and for each branch, a despreading, an addition of said first symbol replica signal, and an estimation of a transmission line from said first residual signal on the basis of said secondary path timings;
- a rake/diversity synthesizer which performs a rake synthesis and a diversity synthesis on signals from a plurality of said despreaders/transmission line estimators to output a synthesized signal;
- a symbol replica generator which generates said second symbol replica signal on the basis of said synthesized signal supplied from said rake/diversity synthesizer to output said second symbol replica signal to said third interference estimation unit; and
- a chip replica generator which generates said second chip replica signal by respreading said second symbol replica signal generated in said symbol replica generator to output said second chip replica signal.

6. The multistage interference canceller according to claim 1, wherein said third interference estimation unit comprises:
- a plurality of despreaders/transmission line estimators, each of said despreaders/transmission line estimators performing, for each path and for each branch, a despreading, an addition of said second symbol replica signal, and an estimation of a transmission line from said second residual signal on the basis of said secondary path timings;
- a rake/diversity synthesizer which performs a rake synthesis and a diversity synthesis on signals from a plurality of said despreaders/transmission line estimators to output a synthesized signal; and
- a symbol replica generator which generates said user signal on the basis of said synthesized signal supplied from said rake/diversity synthesizer.

7. A multistage interference canceller for extracting each user signal from a received signal containing spectrum spread signals of a plurality of users by removing signal components of the users other than said each user, which comprises:

a first stage comprising:
- a plurality of first interference estimation units provided for respective users, each of said first interference estimation units generating a first symbol replica signal and a first chip replica signal from said received signal or a first subtracted signal on the basis of primary path timings, said first symbol replica signal being the same as a signal component of said each user, and said first chip replica signal being a respread signal from said first symbol replica signal;
- a plurality of first delay circuits connected one another in series, each of said first delay circuit outputting said received signal or a signal inputted thereto after delaying said received signal or the signal inputted thereto by a first prescribed period; and
- a plurality of first subtractors, each of said first subtractors being provided after each of said first delay circuits and subtracting said first chip replica signal which is outputted from each of said first interference estimation units from a signal outputted from a preceding first delay circuit to output the residual as said first subtracted signal to a succeeding first delay circuit and a corresponding first interference estimation unit;

a plurality of path search units provided for respective users, each of said path search units comprising:
- means for setting path timings which are obtained by performing path search on said received signal using a spread signal or said first subtracted signal as said primary path timings;
- means for setting path timings which are obtained by performing path search on a residual signal which is an output from the last of said first subtractors or a second subtracted signal as temporal secondary path timings of paths having said primary path timings; and
- means for setting said temporal secondary path timing as a secondary path timing for each path of which signal-to-interference ratio measured is lower than a first prescribed threshold and of which a time difference between said primary path timing thereof and said temporal secondary path timing thereof is shorter than a second prescribed threshold, and for setting said first path timing as a secondary path timing for each path of which signal-to-interference ratio measured is not lower than said first prescribed threshold or of which a time difference between said primary path timing thereof and said temporal secondary path timing thereof is not shorter than said second prescribed threshold;

a second stage comprising:
- a plurality of second interference estimation units provided for respective users, each of said second interference estimation units generating a second symbol replica signal and a second chip replica signal from said first residual signal or said second subtracted signal and said first symbol replica signal on the basis of secondary path timings, said second symbol replica signal being the same as a signal component of said each user, and said second chip replica signal being a respread signal from said second symbol replica signal;
- a plurality of second delay circuits connected one another in series, each of said second delay circuits outputting said first residual signal or a signal inputted thereto after delaying said first residual signal or the signal inputted thereto by a second prescribed period; and a plurality of second subtractors, each of said second subtractors being provided after each of said second delay circuits and subtracting said second chip replica signal which is outputted from each of said second estimation units from a signal outputted from a preceding second delay circuit to output the residual as said second subtracted signal to a succeeding second delay circuit, a corresponding second interference estimation unit, and a corresponding means for setting path timings; and a third stage comprising:

a plurality of third interference estimation units provided for respective users, each of said third interference estimation units generating said user signal and a third chip replica signal from a second residual signal which is an output from the last of said second subtractors or a third subtracted signal and said second symbol replica signal on the basis of secondary path timings, and said third chip replica signal being a respread signal from said user signal;

a plurality of third delay circuits connected one another in series, each of said third delay circuits outputting said second residual signal or a signal inputted thereto after delaying said second residual signal or the signal inputted thereto by a third prescribed period; and a plurality of third subtractors, each of said third subtractors being provided after each of said third delay circuits and subtracting said third chip replica signal which is outputted from each of said third estimation units from a signal outputted from a preceding third delay circuit to output the residual as said third subtracted signal to a succeeding third delay circuit and a corresponding third interference estimation unit.

8. The multistage interference canceller according to claim 7, wherein more than one second stage is provided between said first stage and said third stage.

9. The multistage interference canceller according to claim 7, wherein said second stage is deleted and wherein said fist stage is connected to said third stage.

10. The multistage interference canceller according to claim 7, wherein said first interference estimation unit comprises:

a plurality of despreaders/transmission line estimators, each of said despreaders/transmission line estimators performing, for each path and for each branch, a despreading and an estimation of a transmission line from said received signal or said first subtracted signal on the basis of said primary path timings;

a rake/diversity synthesizer which performs a rake synthesis and a diversity synthesis on signals from a plurality of said despreaders/transmission line estimators to output a synthesized signal;

a symbol replica generator which generates said first symbol replica signal on the basis of said synthesized signal supplied from said rake/diversity synthesizer to output said first symbol replica signal to said second interference estimation unit; and a chip replica generator which generates said first chip replica signal by respreading said first symbol replica signal generated in said symbol replica generator to output said first chip replica signal.

11. The multistage interference canceller according to claim 7, wherein said second interference estimation unit comprises:

a plurality of despreaders/transmission line estimators, each of said despreaders/transmission line estimators performing, for each path and for each branch, a despreading, an addition of said first symbol replica signal, and an estimation of a transmission line from said first residual signal or said second subtracted signal on the basis of said secondary path timings;

a rake/diversity synthesizer which performs a rake synthesis and a diversity synthesis on signals from a plurality of said desperaders/transmission line estimators to output a synthesized signal;

a symbol replica generator which generates said second symbol replica signal on the basis of said synthesized signal supplied from said rake/diversity synthesizer to output said second symbol replica signal to said third interference estimation unit; and a chip replica generator which generates said second chip replica signal by respreading said second symbol replica signal generated in said symbol replica generator to output said second chip replica signal.

12. The multistage interference canceller according to claim 7, wherein said third interference estimation unit comprises:

a plurality of despreaders/transmission line estimators, each of said despreaders/transmission line estimators performing, for each path and for each branch, a despreading, an addition of said second symbol replica signal, and an estimation of a transmission line from said second residual signal or said third subtracted signal on the basis of said secondary path timings;

a rake/diversity synthesizer which performs a rake synthesis and a diversity synthesis on signals from a plurality of said despreaders/transmission line estimators to output a synthesized signal; and a symbol replica generator which generates said user signal on the basis of said synthesized signal supplied from said rake/diversity synthesizer.

* * * * *